United States Patent Office 3,291,780
Patented Dec. 13, 1966

3,291,780
SLURRY PROCESS FOR THE PREPARATION OF HYDROCARBON INTERPOLYMERS
Edward K. Gladding, New Castle, and Rolland Shih-yuan Ro, Brandywine Hundred, Del., assignors to E. I. du Pont de Nemours and Company, Wilmington, Del., a corporation of Delaware
No Drawing. Filed June 16, 1961, Ser. No. 117,504
9 Claims. (Cl. 260—80.5)

This application is a continuation-in-part of our copending application Serial No. 60,583, filed October 5, 1960, and now abandoned.

This invention relates to a process of preparing elastomeric copolymers of ethylene with other copolymerizable hydrocarbon monomers and more particularly to an improved process wherein the copolymer is prepared as a slurry in selected halogenated hydrocarbons.

When copolymers of ethylene with other selected hydrocarbon monomers are made in solution, the viscosity tends to be inconveniently high unless the solids content is kept quite low. A high viscosity leads to excessive power requirements for agitation and makes removal of the large heat of polymerization very difficult, thereby adversely influencing the economic potential of these copolymers. It would be desirable to obtain higher yields of copolymer per unit volume of reactor capacity and to minimize the solvent recovery problem.

It is an object of the present invention to provide a new process for the copolymerization of ethylene with selected copolymerizable hydrocarbon monomers. A further object is to provide a process wherein ethylene is copolymerized with selected hydrocarbon monomers in selected halogenated hydrocarbons. A still further object is to provide a novel catalyst system for copolymerizing ethylene with selected copolymerizable hydrocarbon monomers. Other objects will appear hereinafter.

These and other objects of this invention are accomplished by the process of copolymerizing a sufficient proportion of ethylene with selected hydrocarbon monomers at a temperature between —30 and 50° C. in the presence of a coordination catalyst to form an elastomeric copolymer having about 20 to 75 percent by weight of said ethylene monomer units; with the provisos that said copolymerization is carried out in a halogenated liquid hydrocarbon selected from the group consisting of methylene chloride, ethyl chloride and 1,2-dichloroethane; the total concentration of copolymerizable monomers shall not exceed 2 molar when said liquid hydrocarbon is methylene chloride, shall not exceed 2 molar when said liquid hydrocarbon is 1,2-dichloroethane and shall not exceed 5 molar when said liquid hydrocarbon is ethyl chloride; and the copolymerization temperature shall not exceed the boiling point at atmospheric pressure of the particular liquid halogenated hydrocarbon which is being used. The use of the particular halogenated hydrocarbons under the selected conditions of temperature and monomer concentration are the critical features of the present invention. When the copolymerization is carried out under these conditions, the copolymers precipitate from the reaction mixture during the copolymerization so as to form a halogenated hydrocarbon copolymer slurry. This slurry avoids undesired viscosity build-up and permits ready copolymer separation from the major portion of the halogenated hydrocarbon by convenient mechanical means. It is well known that polyethylene forms as a slurry when conventional hydrocarbon or halogenated hydrocarbon solvents are employed; however, it has not heretofore been recognized that normally solid elastomeric hydrocarbon copolymers containing as little as 20 percent by weight of ethylene monomer units can be formed as a slurry in certain halogenated hydrocarbons over a selected range of temperatures and monomer concentrations.

The copolymers which may be prepared according to the improved process of the present invention are the normally solid copolymers of ethylene and at least one other copolymerizable compound. In order to get a copolymer with desirable elastomeric properties it should contain between about 20 to 75 percent by weight of ethylene units. Representative copolymers are those obtained by copolymerizing ethylene with an alpha monoolefin having the structure R—CH=CH$_2$ wherein R is an alkyl radical of not more than eight carbon atoms or by copolymerizing ethylene, an alpha monoolefin as defined above and a non-conjugated hydrocarbon diene. Representative dienes include dicyclopentadiene; an aliphatic diene having the structure

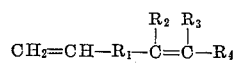

wherein $R_1$ is an alkylene radical, $R_2$ and $R_3$ are independently selected from the group consisting of hydrogen and alkyl radicals and $R_4$ is an alkyl radical and wherein $R_1$ to $R_4$ are so selected that the diene has from about 6 to 22 carbon atoms; a 5-alkenyl-substituted-2-norbornene; 5-methylene-2-norbornene; and 2-alkyl-2,5-norbornadienes.

Representative examples of copolymers of ethylene and at least one alpha monoolefin as defined above are ethylene/propylene, which is preferred; ethylene/1-butene; ethylene/1-heptene; ethylene/1-decene; ethylene/propylene/1-butene; ethylene/1-pentene/1-octene; ethylene/5-methyl - 1 - hexene; ethylene/4 - methyl - 1 - pentene/5, 6,6 - trimethyl - 1 - heptene; and ethylene/1 - butene/1-pentene/1-nonene.

Representative examples of aliphatic dienes, having the structure

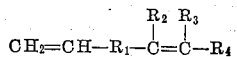

wherein the R's are as defined above, include 1,4-hexadiene, which is preferred; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl - 1,8 - undecadiene; 8 - ethyl - 1,8 - decadiene; 10-ethyl - 1,9 - dodecadiene; 12 - ethyl - 1,12 - tetradecadiene; 13 - n - butyl - 1,12 - heptadecadiene; and 15-ethyl-1,15-heptadecadiene. Dienes such as 11-ethyl-1,11-tridecadiene are made by reacting an alkyl Grignard reagent with the alkyl ester of an ω-unsaturated carboxylic acid and dehydrating the tertiary alcohol thereby produced.

Examples of copolymers of ethylene, an alpha monoolefin and at least one of these aliphatic dienes include ethylene/propylene/1,4-hexadiene, which is preferred; ethylene/1 - butene/1,4-hexadiene/11-ethyl-1,11-tridecadiene; ethylene/1-butene/1-octene/6-methyl-1,5-heptadiene; and ethylene/1-pentene/1,4-hexadiene/1,9-octadecadiene.

These copolymers contain ethylenic unsaturation corresponding to an iodine number of at least 3 and preferably not more than 50, and have intrinsic viscosities in tetrachloroethylene at 30° C. of 1.0 to 10 (corresponding to viscosity-average molecular weights of about 30,000 and 700,000 respectively). There are present in the copolymer about 0.1 to 2.5 gram-moles, preferably 0.1 to 1.0 gram-mole, of diene units per kilogram of copolymer.

Another group of copolymers which may be prepared according to the present invention are those copolymers of ethylene, at least one alpha monoolefin as defined above and dicyclopentadiene. Representative examples include ethylene/propropylene/dicyclopentadiene, which is preferred;

ethylene/1-butene/dicyclopentadiene;
ethylene/propylene/1-butene/dicyclopentadiene;
ethylene/1-octene/dicyclopentadiene;
ethylene/propylene/1-hexene/dicyclopentadiene;
ethylene/1-heptene/1-decene/dicyclopentadiene; and
ethylene/5-methyl-1-heptene/dicyclopentadiene In order that these copolymers be elastomeric, they should contain at least about 20 percent ethylene monomer units by weight, at least about 25 percent R—CH=CH$_2$ monomer units (as described) by weight, and no more than about 25 percent dicyclopentadiene monomer units by weight. The ethylene monomer unit concentration ranges in general from about 20 percent to about 72.5 percent by weight. Copolymers having more ethylene monomer units tend to be stiff and non-elastomeric. The concentration of R—CH=CH$_2$ monomer units ranges in general from about 25 percent to about 77.5 percent by weight. Copolymers having a higher propylene content are known to be leathery and boardy. The copolymer has an iodine number between about 5 and 50. There are present in the copolymer about 0.1 to 2.5 gram-moles, preferably 0.1 to 1.0 gram-mole, of diene units per kilogram of copolymer.

Still another group of copolymers which may be prepared and isolated are those copolymers of ethylene, at least one alpha monoolefin as defined above and a 5-alkenyl-substituted-2-norbornene or 5-methylene-2-norbornene.

To obtain 5-methylene-2-norbornene, allene having the formula H$_2$C=C=CH$_2$ is heated in the absence of a polymerization initiator with cyclopentadiene. Preferably the reaction is carried out at a temperature of 175–225° C. and still more preferably above 200° C. and in the presence of an addition polymerization inhibitor. The broad temperature operating range is generally between about 150° and 250° C. The pressure under which this reaction is carried out is not critical. Good results are obtained when the reactants are heated in a closed container under the autogenous pressure developed by the reactants under the operating conditions. The reaction vessel can be constructed of any material which is inert to the reactants and is capable of withstanding the operating pressures. Reaction vessels made of glass, stainless steel and glass-lined steel are quite satisfactory. The reaction time can be varied widely. Times ranging from 2–24 hours or more at 150° C. to 250° C. are operable. Very good results are obtained in reaction periods ranging from 4 to 16 hours. Reactants which are commercially available in the grades used for polymerization are satisfactory for use in making 5-methylene-2-norbornene. However, best results are obtained when the allene is relatively pure.

Representative examples of copolymers of ethylene, at least one alpha monoolefin and 5-methylene-2-norbornene include ethylene/propylene/5-methylene-2-norbornene;
ethylene/1-butene/5-methylene-2-norbornene;
ethylene/1-decene/5-methylene-2-norbornene;
ethylene/5,5-dimethyl-1-octene/5-methylene-2-norbornene;
ethylene/4-methyl-1-hexene/5-methylene-2-norbornene;
ethylene/4,4-dimethyl-1-pentene/5-methylene-2-norbornene;
ethylene/5,6,6-trimethyl-1-heptene/5-methylene-2-norbornene.

The ethylene monomer unit concentration ranges in general from about 20 percent to about 72.5 percent by weight. Copolymers having more ethylene monomer units tend to be stiff and non-elastomeric. The concentration of R—CH=CH$_2$ monomer units ranges in general from about 25 percent to about 77.5 percent by weight. Copolymers having a higher propylene content are known to be leathery and boardy.

The 5-methylene-2-norbornene diolefin monomer units should be present in sufficient amount to provide for sulfur curability, i.e., at least about 0.03 gram-mole per 100 grams of elastomer, while the maximum amount present by weight should be such as to not interfere seriously with the elastic character of the product, i.e., not over about 20 percent by weight.

As another indication of adequate curability, the iodine number of the copolymer should be at least 5. The iodine number is a measure of the total unsaturation of the polymer and this unsaturation arises from (1) the methylene radical of 5-methylene-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

The 5-alkenyl-2-norbornenes may be described by the following formula

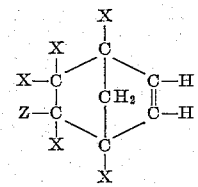

wherein each X represents hydrogen or a monovalent alkyl radical of from 1 to 6 carbon atoms; Z represents a monovalent alkenyl radical, the carbon-to-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula

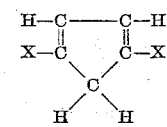

in which X is as heretofore described; the X's can be the same or different. The reaction is carried out at autogenous pressure in a closed inert (e.g. glass and stainless steel) container at temperatures ranging between about 150 to 250° C., preferably 175–225° C., for times ranging between about 2 to 24 hours. It is preferred that an addition polymerization inhibitor (e.g. hydroquinone) be present. Representative syntheses of this type are: the formation of 5-(2'-butneyl)-2-norbornene from cyclopentadiene and 1,4-hexadiene; the preparation of 5-(1-propenyl)-2-norbornene from cyclopentadiene and 1,3-pentadiene (often called piperylene).

The reaction of cyclopentadiene with conjugated dienes having the structure X'—CH=CH—CH=CH—X'', where X' and X'' are alkyl radicals, can be used to prepare 6-alkyl-5-alkenyl-2-norbornenes having the structures

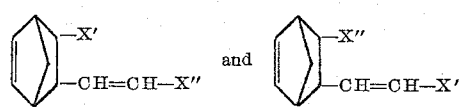

The reaction of cyclopentadiene with unsymmetrical nonconjugated dienes of the structure

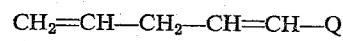

where Q is an alkyl radical will lead to 5-(2-alkenyl)-2-norbornenes

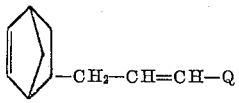

The reaction of cyclopentadiene with conjugated dienes of the formula CH$_2$=CH—CH=CH—Q', where Q' is an alkyl radical, will produce

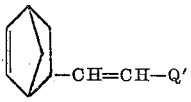

The 2-norbornenes having the structures

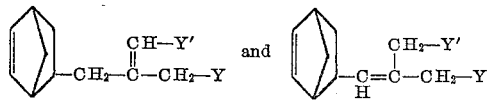

where Y is H or alkyl and Y' is alkyl, are made by reacting the Grignard reagent of 5-bromomethyl-2-norbornene in ether with ketones having the structure

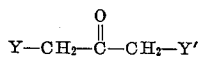

and dehydrating the resulting tertiary carbinol in refluxing toluene in the presence of anhydrous copper sulfate. The preparation of 5-(2'-ethyl-2'-butenyl)-2-norbornene from diethyl ketone is typical.

Representative examples of the heretofore described 2-norbornenes include:

5-(2'-ethyl-2'-butenyl)-2-norbornene;
5-(2'-ethyl-1'-butenyl)-2-norbornene;
5-(2'-methyl-1'-propenyl)-2-norbornene;
5-(2'-propyl-2'-pentenyl)-2-norbornene;
5-(2'-hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene;
5-(2'-ethyl-2'-decenyl)-2-norbornene; and
5-(2'-ethyl-1'-octenyl)-2-norbornene.

Representative examples of copolymers of ethylene, at least one alpha monoolefin and a 5-alkenyl-2-norbornene include ethylene/propylene/5-(2'-butenyl)-2-norbornene;
ethylene/propylene/5-(2'-ethyl-2'-butenyl)-2-norbornene;
ethylene/propylene/5-(2'-ethyl-1'-butenyl)-2-norbornene;
ethylene/propylene/5-(1'-propenyl)-2-norbornene;
ethylene/1-butene/5-(2'-heptyl-1'-undecenyl)-2-norbornene;
ethylene/1-butene/5-(2'-butenyl)-2-norbornene;
ethylene/1-butene/5-(2'-ethyl-2'-butenyl)-2-norbornene;
ethylene/4,4-dimethyl-1-hexene/5-(2'-propyl-2'-pentenyl)-2-norbornene;
ethylene/5,5-dimethyl-1-octane/5-(2'-nonyl-2'-heptenyl)-2-norbornene;
ethylene/6-methyl-1-heptene/5-(2'-methyl-2'-decenyl)-2-norbornene;
ethylene/1-decene/5-(2'-hexyl-2'-butenyl)-2-norbornene; and
ethylene/5,6,6-trimethyl-1-heptene/5-(2'-octyl-2'-butenyl)-2-norbornene.

The ethylene monomer unit concentration ranges in general from about 20 percent to about 72.5 percent by weight. Copolymers having more ethylene monomer units tend to be stiff and non-elastomeric. The concentration of R—CH=CH$_2$ monomer units ranges in general from about 25 percent to about 77.5 percent by weight. Copolymers having a higher propylene content are known to be leathery and boardy.

The 5-alkenyl-2-norbornene diolefin monomer units should be present in sufficient amount to provide for sulfur curability, i.e., at least about 0.03 gram-mole per 100 grams of elastomer, while the maximum amount present by weight should be such as to not interfere seriously with the elastic character of the product, i.e., not over about 20 percent by weight.

As another indication of adequate curability, the iodine number of the copolymer should be at least 5. The iodine number is a measure of the total unsaturation of the polymer and this unsaturation arises from two sources (1) the alkenyl radical of the 5-alkenyl-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

Still another group of copolymers which may be prepared are copolymers of ethylene, at least one alpha monoolefin as defined above and a 2-alkyl-substituted-2,5-norbornadiene. Representative examples include: ethylene/propylene/2-methyl-2,5-norbornadiene; ethylene/propylene/2-ethyl-2,5-norbornadiene; ethylene/1-butene/2-methyl-2,5-norbornadiene; ethylene/1-hexene/2-ethyl-2,5-norbornadiene; ethylene/1-decene/2-butyl-2,5-norbornadiene; and ethylene/1-heptene/2-octyl-2,5-norbornadiene.

The 2-alkyl-2,5-norbornadienes can be described by the following structural formula

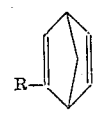

where R is a $C_1$-$C_8$ alkyl radical. These dienes are made by heating acetylenes having the formula

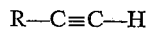

where R is a $C_1$-$C_8$ alkyl radical, with cyclopentadiene at 175–225° C. in the absence of a polymerization initiator. Closed reaction vessels made from stainless steel or glasslined steel are satisfactory.

The coordination catalysts which are used in the improved process of this invention are generally prepared from compounds of metals of groups IVB, VB, and VIB and organo-metallic compounds of elements of groups IA, IIA, and IIIA. Aluminum alkyls or aluminum halogeno alkyls are suitable organometallics and vanadium halides, oxyhalides, or derivatives where organic radicals are bonded to the vanadium through an oxygen atom are suitable transition element compounds. Representative catalysts are made by contacting vanadium compounds, such as vanadium tris(acetylacetonate), vanadium oxybis(acetylacetonate), vanadium oxytris(isobutoxide) or vanadium oxytrichloride, with organoaluminum compounds, such as diisobutylaluminum chloride, isobutylaluminum dichloride, triisobutylaluminum, diisobutylaluminum bromide, isobutylaluminum dibromide, the reaction product of 0.5 mole to 2.0 moles of aluminum bromide and 1.0 mole of triisobutylaluminum, or the reaction product of 0.5 mole to 2.0 moles of aluminum chloride and 1.0 mole of triisobutylaluminum. The catalyst made by mixing titanium tetrachloride and triisobutylaluminum is also suitable. As is apparent to those skilled in the art, the selection of the preferred catalyst components will depend to a certain extent on the particular copolymer to be prepared. In making the ethylene/propylene copolymer or the ethylene/propylene/1,4-hexadiene copolymer the preferred catalyst is made by mixing vanadium tris(acetylacetonate) with the reaction product of 1.0 mole of triisobutylaluminum and 0.5 mole of aluminum chloride.

In preparing the coordination catalysts either the aluminum compound or the vanadium compound is contacted with a mixture of the other in the halogenated hydrocarbon; alternatively, both compounds are introduced simultaneously into the halogenated hydrocarbon. On account of the instability of organo aluminum solutions in halogenated hydrocarbon solvents, the organo aluminum compounds are sometimes supplied commercially for operating safety as hydrocarbon solutions. Since the catalyst concentration in the polymerization mixture is very low, the small amount of hydrocarbon diluent thereby introduced will not interfere with the desired slurry formation. In general, the total concentration of (hydrocarbon solvent+all monomers) shall not exceed about 2 molar with methylene chloride or 1,2-dichloroethane and 5 molar with ethyl chloride.

The catalyst can be formed before, during, or after the introduction of the copolymerizable monomers. When making the above-described representative coordination catalysts, the proportions of the aluminum compound to the vanadium compound are selected so that there are at least 6 isobutyl groups for every atom of vanadium. When aluminum triisobutyl is employed, the value of the molar ratio of Al:V is at least 2:1. Similarly, the value is at least 3:1 when diisobutylaluminum chloride is used. When the aluminum compound is made by reacting triisobutylaluminum with aluminum chloride, the triisobutylaluminum supplied should provide at least 6 isobutyl groups for every atom of vanadium. When the value of the isobutyl:vanadium ratio is below 6:1, the catalyst activity tends to be reduced. The preferred value ranges from about 15:1 to 21:1 (corresponding to an Al:V ratio of 5:1 to 7:1 when triisobutylaluminum is used). Higher values such as 30:1 are suitable.

Those skilled in the art can determine the concentrations of the aluminum and vanadium compounds which give the most convenient process and the copolymer product best suited for a particular purpose. The vanadium concentration in the reaction mixture usually ranges from about 0.00005 to 0.1 molar, 0.0005 to 0.05 molar often being preferred. It is possible to prepare concentrated mixtures which, when desired, can be diluted by addition of more liquid halogenated hydrocarbon.

As noted above, the catalysts used in the present invention can be made in the presence or absence of the copolymerizable monomers. In the former case, the representative vanadium and aluminum compounds can be simultaneously or sequentially added in a single portion or intermittently or continually to a mixture of part or all of the monomers in the liquid halogenated hydrocarbon. In the latter case, a so-called "premixed" catalyst is made. It can be stored in the absence of air, water, carbon dioxide, Zerewitinoff active hydrogen compounds, and the like for indefinite periods of time at room temperature. In general, the catalyst stability decreases as the temperature is raised.

When operating the present invention, the monomer mixture is contacted with the coordination catalyst at atmospheric, subatmospheric or superatmospheric pressure. In typical procedures, the representative above-described vanadium and aluminum compounds are added to the liquid halogenated hydrocarbon before, at the same time, or after monomer addition. The operating temperature is one of the critical features of the present invention. If the process is operated at temperatures above those recommended, partial or complete solubilization of the copolymer product will occur. In every case the temperature should not exceed the boiling point at atmospheric pressure of the liquid halogenated hydrocarbon medium being used. For ethyl chloride and methylene chloride the respective limits are about 13 and 40° C. Although 1,2-dichloroethane boils at about 84° C., the operating temperature should not exceed 50° C.; at higher temperatures the catalyst activity tends to be inconveniently short-lived and there is an increased tendency for reaction between the catalyst and 1,2-dichloroethane. It is generally inconvenient to operate at temperatures below about −30° C. because additional cooling equipment is required; furthermore, at temperatures much below −30° C. the reaction rate is undesirably reduced and it is more difficult to prepare copolymers of suitable composition. The preferred temperature for copolymerizations in methylene chloride at atmospheric pressure lies between about −15° C. and 15° C. At temperatures above 15° C. at atmospheric pressure the yield per unit volume of reactor tends to decrease; this result probably reflects the decreased monomer solubility in the halogenated hydrocarbon. At temperatures above 50° C., interaction between the halogenated hydrocarbon and the catalyst components becomes prominent enough to decrease the catalyst activity significantly.

Any material is suitable for the reaction vessel which is inert to the reactants. Glass, glass-enamel, or stainless steel are satisfactory. The reactor should be equipped with means for agitation. The gas outlet tube should be protected from inflow of outside air by suitable traps.

In carrying out the polymerization process, the monomers are introduced, separately or in admixture, at a rate equal to or in excess of the rate at which copolymer is formed. All of the monomers may be present before the run is started. Alternatively, part or all of the monomers may be added during the polymerization. It is preferred that gas monomer mixtures contain at least 5 mole percent ethylene. This introduction may be continuous or periodic. In order to avoid unduly fast reaction rates and to avoid solubilization of the copolymer, the maximum total concentration of the monomers in the halogenated hydrocarbon should not exceed the above-described limits.

The copolymers can be prepared by a continuous process at atmospheric or superatmospheric pressure. Thus, the liquid halogenated hydrocarbon, aluminum and vanadium compounds, and monomers may be introduced continuously into a polymerization zone at such a rate as to provide a residence time sufficient to build up the desired concentration of copolymer in the polymerization mass. The residence time may vary widely, from, say, 10 minutes to several hours or more. In general, the residence time will be shorter as the concentrations of monomers and catalysts in the feed stream are increased. The polymer slurry which continually overflows from the polymerization zone is contacted in a subsequent zone with a catalyst deactivator; the copolymer is ultimately continually obtained after suitable continuous purification and isolation procedures similar to those described below.

In operating the polymerization process care should be taken to exclude all traces of moisture and oxygen since they tend to poison the catalyst systems. A protective atmosphere of an inert gas such as argon or nitrogen is often supplied prior to the introduction of the gaseous monomer feed stream. Monomer gases can be purified by passing them successively through columns of silica gel, scrubbers containing triisobutyl aluminum, and a column of silica gel connected to the inlet tube of the reaction vessel. The dienes and normally liquid alpha monoolefins (or selected substituted alpha monoolefins) can be purified by fractional distillation and passage through silica gel.

The copolymeric product separates during the reaction and forms a slurry with the halogenated hydrocarbon which avoids undesired viscosity build-up and permits ready isolation. After the reaction has been stopped by deactivating the catalyst with alcohol, the copolymer is separated from the major portion of the halogenated hydrocarbon by conventional mechanical means, filtration or centrifugation being representative techniques. A nonvolatile antioxidant, such as 2,2'-methylenebis(6-tert-butyl-4-methylphenol) or 4,4' - thiobis(2 - tert - butyl-5-methylphenol), is often incorporated prior to the final isolation step to avoid possible oxidation and degradation of the copolymer. After isolation, the copolymer may be treated with dilute mineral acid and subsequently washed acid-free with water; alternatively it can be treated with acetone in a mixing device, such as a Waring "Blendor." In any event the copolymer product can be finally obtained by drying, as for example, in a vacuum oven. The copolymers can be mill dried.

As noted above, it is an essential feature of the present invention that the hydrocarbon copolymer being produced be substantially completely insoluble in the reaction medium in which it is formed. Necessarily the reaction medium consists of a mixture of one of the several halogenated hydrocarbon solvents enumerated previously and the hydrocarbon monomers which are to be copolymerized, the halogenated hydrocarbon being by far the predominant constituent of the reaction medium. The solubility of the hydrocarbon polymer being produced is influenced both by the concentration of the hydrocarbon monomer present and by the temperature at which the copolymerization reaction is carried out.

The polymerization temperature influences the solubility of the copolymer in the reaction medium, and each of the halogenated hydrocarbon solvents which predominate in the reaction medium exhibits a different temperature limit at which the hydrocarbon copolymer becomes appreciably soluble. A typical copolymer of this invention, that of ethylene, propylene and 1,4-hexadiene, is soluble in 1,2-dichloroethane to the undesired extent of 10 percent by weight at 84° C. Another typical copolymer of ethylene and propylene becomes appreciably soluble in methylene chloride at about 60° C. and forms a homogeneous viscous solution as the temperature is increased to about 70° C. The aforementioned ethylene, propylene, 1,4-hexadiene copolymer is completely soluble and forms a highly viscous solution in ethyl chloride at about 20° C.

As the concentration of hydrocarbon monomers increases the copolymers tend to become partially or completely soluble in the reaction medium causing an undesirable increase in viscosity and necessitating a product isolation procedure which involves the evaporation of major amounts of solvent. When the above-described critical temperature limits are observed, the copolymers are substantially completely insoluble if the total concentration of monomers, as described above, in these halogenated hydrocarbon media is observed, i.e., not more than 2 moles per liter with methylene chloride or 1,2-dichloroethane and not more than 5 moles per liter with ethyl chloride.

Monomer concentrations can be controlled in several ways so that the total concentration limit of all monomers in the halogenated hydrocarbon medium is observed. The concentrations of the monomers which are liquid at the operating temperature and pressure, are controlled simply by adding the appropriate quantities of the monomers to a given volume of the chlorinated hydrocarbon medium. This mode of control is applicable, by way of illustration, when adding normally liquid monomers such as 1-hexene and 1,4-hexadiene to a reactor maintained at atmospheric pressure and 25° C.

When the reaction vessel has no free vapor space—that is, the reaction system is at all times liquid full—the concentrations of monomers which are gaseous at the temperature and pressure existing in the reactor can be controlled merely by supplying the appropriate quantities of the monomers to a given volume of the halogenated hydrocarbon medium.

When the normally gaseous monomers are used in a reaction system which has a vapor space, their concentrations are controlled by the partial pressures of the gaseous monomers in the vapor space over the reaction medium and by the reaction temperature. In accordance with Henry's Law, at constant temperature the concentration of a gaseous monomer in the reaction medium is proportional to its partial pressure in the vapor space above the reaction medium. As the reaction temperature increases, the solubility of gaseous monomers in the reaction medium decreases provided the partial pressure of the reaction medium decreases provided the partial pressure of the gaseous monomer remains constant. Once the Henry's Law constant has been determined for the monomer in the halogenated hydrocarbon medium being used, the concentration of the monomer desired in that medium thereafter can be attained by maintaining the appropriate monomer partial pressure calculated from Henry's Law. The solubility behavior of propylene and ethylene in a representative halogenated hydrocarbon will illustrate an application of this method.

The solubilities of propylene and ethylene were measured in methylene chloride at 0° C. at a total pressure of 1 atmosphere. The results of those measurements established that the solubilities of propylene and ethylene under the above-stated conditions are 1.33 moles/liter and 0.181 moles/liter, respectively. These values represent the maximum possible concentrations of propylene and ethylene, respectively, during polymerization in methylene chloride at 0° C. when the total pressure is 1 atmosphere. In cases where mixtures of these gaseous monomers are used the maximum possible concentrations of each are even less because each gas dilutes and reduces the partial pressure of the other. In accordance with Henry's Law the concentrations of each of the gaseous monomers in solution is thereby reduced. At atmospheric pressure and at polymerization temperatures of above 0° C. the concentrations of ethylene and propylene in the reaction medium are less than those stated above.

The solubilities of propylene and ethylene in methylene chloride, ethyl chloride and 1,2-dichloroethane at various temperatures were computed from the solubility measurements made a 0° C. at 1 atmosphere total pressure in methylene chloride referred to above. The computations were made by known methods as, for example, described in "Solubilities of Nonelectrolytes" 3rd Ed. N.Y. (1950) by J. H. Hildebrand and R. L. Scott.

The solubilities are tabulated:

SOLUBILITY OF PROPYLENE IN MOLES/LITER OF SOLVENT AT A PROPYLENE PRESSURE OF 1 ATMOSPHERE

| Solvent | Temperature, ° C. | | |
| --- | --- | --- | --- |
| | 0 | −10 | −20 |
| Methylene chloride | 1.60 | 2.25 | 3.34 |
| Ethyl chloride | 2.64 | 3.9 | 6.20 |
| 1,2-dichloroethane | 1.23 | 1.7 | 2.56 |

SOLUBILITY OF ETHYLENE IN MOLES/LITER OF SOLVENT AT AN ETHYLENE PRESSURE OF 1 ATMOSPHERE

| | 0 | −10 | −20 |
| --- | --- | --- | --- |
| Methylene chloride | 0.23 | 0.28 | 0.35 |
| Ethyl chloride | 0.31 | 0.37 | 0.45 |
| 1,2-dichloroethane | 0.18 | 0.22 | 0.26 |

The following examples will better illustrate the nature of the present invention; however, the invention is not intended to be limited to these examples. Parts are by weight unless otherwise indicated.

*Example 1.—Preparation of ethylene/propylene copolymer*

(A) *Preparation of vanadium tris(acetylacetonate)*.—Three grams of $VCl_3$ were dissolved in 10 milliliters of dilute sulfuric acid. The resulting solution was added to 20 milliliters of acetylacetone in an Erlenmeyer flask. When this mixture was shaken, a reaction occurred and heat was evolved. Five minutes later the resulting dark brown solution was neutralized with aqueous sodium carbonate. The brown crystals which then precipitated were collected by filtration, washed with water and air-dried. Seven grams of vanadium tris(acetylacetonate) were obtained melting at 195–196° C. (after recrystallization from benzene and petroleum ether).

*Analysis.*—Calc'd. for $VC_{15}H_{21}O_6$: 14.4% V. Found: 14.6, 14.5% V.

(B) The reaction flask was a one-liter glass resin flask equipped with a stirrer, a thermometer, a gas inlet tube, a gas outlet tube, and liquid inlet tube covered with a rubber (serum) cap. This apparatus was flame dried and allowed to cool under a stream of purified nitrogen which was maintained during subsequent operations until monomer gases were introduced. One liter of methylene chloride at about 20° C. was filtered through a column of silica gel directly into the reaction flask. The filtered, rapidly stirred methylene chloride was then sparged with the purified nitrogen for about 30 minutes. Then 0.35 gram (0.001 mole) of vanadium tris(acetylacetonate) and 1.3 milliliters (0.007 mole) of distilled diisobutylaluminum monochloride were introduced into the reactor (isobutyl:V molar ratio 14:1). A reddish-brown solution resulted which gradually became light brown.

Five minutes later, the nitrogen feed was stopped and a feed stream supplying ethylene and propylene at respective rates of 750 and 2250 cc./min. was introduced into the agitated catalyst solution by means of the gas inlet tube which projected below the liquid surface. The ethylene and propylene had been separately metered through flow-meters connected to separate purification trains where they passed successively through a column of silca gel, 3 columns each containing 20% solutions of aluminum triisobutyl in "Nujol" oil (a liquid petrolatum of specific gravity 0.88/0.90 at 60° F.), a column of "Nujol" oil, and a final silica gel column leading to a T-tube joining the streams. The nitrogen was purified by passage through a similar train.

For 30 minutes the reaction mixture was agitated at about 20° C. while monomer gases were introduced. The total monomer concentration was less than 2 moles per liter of methylene chloride. The copolymer product precipitated to form a slurry during this period. Then 10 milliliters of n-butanol containing 0.1% by weight 4,4'-thiobis(2-tert-butyl-5-methylphenol) were introduced to deactivate the catalyst; the monomer feed stream was stopped. The copolymer was collected by filtration, washed once with 10% hydrochloric acid, and twice with water. After drum drying, 16 grams of rubbery copolymer were obtained containing 55% propylene units (by weight) and exhibiting an inherent viscosity (0.1% solution in tetrachloroethylene at 30° C.) of 4.28.

*Example 2.—Preparation of ethylene/propylene/ 1,4-hexadiene copolymer*

The procedure of Example 1B was repeated except: (a) 8 milliliters of 1,4-hexadiene were introduced into the reactor before the ethylene-propylene feed stream was started; (b) the solvent was removed by evaporation. The total monomer concentration was less than 2 moles per liter of methylene chloride. A yield of 3.9 grams of a rubbery copolymer was obtained having 0.64 gram-mole of diene units/kilogram and 41% propylene units by weight. The copolymer was sulfur-curable.

*Example 3.—Preparation of ethylene/1-hexene/1,4-hexadiene copolymer*

The reaction equipment and gas purification trains described in Example 1B were used. A protective atmosphere of purified nitrogen was maintained except during the monomer gas feed period.

One liter of methylene chloride was placed in the agitated reactor and cooled to 0° C. Then 8.4 grams (0.1 mole) of 1-hexene and 8.2 grams (10 ml., 0.1 mole) of 1,4-hexadiene were introduced. Ethylene gas was supplied to this mixture at the rate of one liter/min. The catalyst was formed in situ by adding 0.35 gram (0.001 mole) of vanadium tris(acetylacetonate) and 10 milliliters of a methylene chloride solution 1.0 molar in trivalent aluminum (prepared by adding triisobutylaluminum and aluminum chloride in 2:1 molar proportions). Gas uptake occurred very rapidly.

During the following 30 minutes the reaction mixture was stirred at 0° C. The total monomer concentration has a maximum value of 0.68 mole per liter of methylene chloride. The copolymer precipitated in small particles as it was formed. During the first 10 minutes two 0.1-mole portions of 1-hexene were added. After 15 minutes a 0.074-mole portion of 1,4-hexadiene was introduced.

The catalyst was deactivated at the end of the 30-minute period by addition of 10 milliliters of n-butanol [containing 0.1% by weight 4,4'-thiobis(2-tert-butyl-5-methylphenol)]. The ethylene feed was shut off. The copolymer was collected by filtration, washed with acetone in a Waring "Blendor" and air dried. Twenty-four grams of rubbery ethylene/1-hexene/1,4-hexadiene copolymer were obtained.

*Example 4.—Preparation of ethylene/1-hexene/1,4-hexadiene copolymer*

The reaction equipment and gas purification trains described in Example 1B were used. A protective atmosphere of purified nitrogen was maintained except during the introduction of ethylene.

Fifty milliliters (0.4 mole) of 1-hexene and 20 milliliters (0.178 mole) of 1,4-hexadiene were added to one liter of methylene chloride agitated at 0° C. The catalyst was formed by introducing 0.35 gram (0.001 mole) of vanadium tris(acetylacetonate) and 5 milliliters of a methylene chloride solution 1.0 molar in trivalent aluminum (prepared by adding triisobutylaluminum and aluminum chloride in 2:1 molar proportions). Then ethylene gas was introduced at the rate of 1 liter/min. for a period of 30 minutes while the agitated reaction mixture was kept at 0° C. The total monomer concentration has a maximum value of 0.76 mole per liter of methylene chloride. The reaction was stopped and the copolymer product, which had separated in small particles, was collected and purified by the procedure of Example 3. Eighteen grams of rubbery ethylene/1-hexene/ 1,4-hexadiene copolymer were obtained.

*Example 5.—Preparation of ethylene/propylene/1,4-hexadiene copolymer*

The apparatus used was similar to that described in Example 1B above. The one-liter reactor, which was continually agitated, was cooled by a Dry Ice acetone bath.

One liter of methylene chloride was introduced into the reactor and sparged with nitrogen while being cooled to −1° C. The nitrogen stream was then shut off and a gaseous mixture of ethylene (rate: 700 cc./min.) and propylene (rate: 2,100 cc./min.) was introduced. Thirty-three minutes later, 0.35 gram (0.001 mole) of vanadium tris(acetylacetonate) and 8 milliliters (0.071 mole) of 1,4-hexadiene were added, in turn. After a 3-minute period the reaction was started by introducing 6 milliliters of a methylene chloride solution 1.5 molar in trivalent aluminum (prepared by adding triisobutylaluminum and aluminum chloride in 2:1 molar proportions). During the subsequent 55-minute reaction period copolymer product continually precipitated to form a slurry. The temperature of the agitated reaction mixture remained between −13 and −4° C. for 40 minutes and finally rose to 3° C. The total monomer concentration was less than 2 moles per liter of methylene chloride. The polymerization was then stopped by addition of 10 milliliters of isopropanol (containing about 0.1% by weight 2,2'-methylenebis(6-tert-butyl - 4 - methylphenol) antioxidant). After the monomer feed had been shut off, the supernatant methylene chloride was poured off and the copolymer collected by filtration. After air drying, 74.5 grams of rubbery product were obtained containing 32.2 weight percent ethylene units, 66 weight percent propylene units, and 1.8% weight 1,4-hexadine units.

*Example 6.—Preparation of ethylene/propylene/5-methylene norbornene copolymer*

The apparatus used was similar to that described in Example 1B above. The one-liter reactor, which was continually agitated, was equipped with a water-cooled condenser and cooled by a Dry Ice acetone bath.

One liter of silica gel dried methylene chloride was added to the reactor and sparged with nitrogen while being cooled to −8° C. After 1.59 grams (0.015 mole) of 5-methylene-2-norbornene had been introduced, the nitrogen was shut off and a gaseous feed stream of ethylene (rate: 1030 cc./min.) and propylene (rate: 2170 cc./min.) was started. Two minutes later 0.35 gram (0.001 mole) of vanadium tris(acetylacetonate) was introduced. After 5 more minutes the polymerization reaction was started by introducing 6 milliliters of methylene chloride solution 1.5 molar in trivalent aluminum (prepared by adding triisobutylaluminum and aluminum chloride in 2:1 molar proportions). In 2 minutes gas absorption was rapid and the temperature had risen to 4° C. During the subsequent 30-minute reaction period copolymer product continually precipitated to form a slurry. The temperature ranged between −5° C. to 4° C. The reaction was stopped by addition of 10 milliliters of ethanol. The total monomer concentration has a maximum value of 1.13 moles per liter of methylene chloride. The copolymer was collected by filtration, washed with acetone in a Waring "Blendor" and mill dried (about 0.05 gram of 4,4′-thiobis(2-tert-butyl-5-methylphenol) was added). The rubbery white ethylene/propylene/5-methylene-2-norbornene copolymer obtained contained 32.1% (by weight) ethylene units, 66% (by weight) propylene units, and 1.9% (by weight) diene units. The yield (83 grams) was approximately triple that obtained when the same monomers were copolymerized under similar conditions with a triisobutylaluminum/vanadium oxytrichloride catalyst in tetrachloroethylene.

*Example 7.—Preparation of ethylene/propylene/5-methylene-2-norbornene copolymer*

The apparatus of Example 6 was used.

5-methylene-2-norbornene (3.2 grams, 3.6 cc., 0.030 mole) was injected to one liter of agitated dry methylene chloride at −10° C. under a nitrogen atmosphere. After the nitrogen had been turned off, a gaseous feed stream of ethylene (rate: 810 cc./min.) and propylene (rate: 2430 cc./min.) was introduced. After 4 minutes, 0.27 gram (0.001 mole) of vanadium oxybis(acetylacetonate) and 6 cc. of a methylene chloride solution 1.5 molar in trivalent aluminum (made by adding aluminum chloride and triisobutylaluminum in 1:2 molar proportions) were added, in turn. The total monomer concentration has a maximum value of 1.8 moles per liter of methylene chloride. During the following 30 minutes copolymer continually precipitated from the agitated reaction mixture while the temperature ranged between −7° C. and −16° C. Then 10 cc. of ethanol was introduced to stop the reaction by deactivating the catalyst. The copolymer was collected by filtration and washed in turn with acetone and an acetone-ethanol mixture in a Waring "Blendor." The white crumb was mill dried at 100° C. to give 40 grams of a sulfur-curable rubbery copolymer containing (by weight) 43.8% ethylene units, 50.0% propylene units and 6.2% 5-methylene-2-norbornene units.

*Example 8.—Preparation of ethylene/propylene/5-methylene-2-norbornene copolymer*

The general procedure of Example 7 was followed using a catalyst from triisobutyl aluminum and vanadium oxytrichloride. The following reactants and conditions were employed:

5-methylene-2-norbornene (3.0 cc., 2.7 grams, 0.025 mole).
Ethylene (1140 cc./min.).
Propylene (2170 cc./min.).
$VOCl_3$ (0.12 cc., 0.0012 mole), reactor conc'n. 0.0012 M.
Triisobutyl Al (0.90 cc., 0.0036 mole), reactor conc'n. 0.0036 M.
Reactor temp. (−7 to −11° C.).
Reactor vol. (1 liter).

The total monomer concentration was less than 2 moles per liter of methylene chloride. The copolymer was collected by filtration and purified by washing with acetone twice), 10% hydrochloric acid, acetone-water and acetone. Mill drying at 100° C. gave 35.5 grams of copolymer containing (by weight) 55.5% ethylene units, 43% propylene units, and 1.5% 5-methylene-2-norbornene units.

*Example 9.—Preparation of ethylene/4-methyl-1-pentene copolymer*

The apparatus used was similar to that described in Example 6. The nitrogen sparged, flame-dried, one-liter reactor was placed in a Dry Ice-aceton bath and loaded, in turn with 912 cc. of dry methylene chloride and 59 grams (88 cc., 0.7 mole) of freshly distilled 4-methyl-1-pentene. The agitated mixture was cooled to −12° C. After a gaseous feed stream had been started supplying ethylene at the rate of 1 liter/min., 0.13 cc. (0.0012 mole) of vanadium oxytrichloride and 1.8 cc. (0.0072 mole) of triisobulylaluminum were injected into the agitated reactor. The total monomer concentration was less than 2 moles per liter of methylene chloride. During the following 30 minutes copolymer continually precipitated; the temperature ranged between −5 and −10° C. The catalyst was then deactivated by addition of 10 cc. of ethanol and the ethylene feed stream stopped. The copolymer was collected by filtration, washed twice with acetone in a Waring "Blendor" and dried overnight. A yield of 25.5 grams of highly crystalline copolymer was obtained containing about 76% ethylene units by weight.

*Example 10.—Preparation of ethylene/propylene/2-methyl-2,5-norbornadiene copolymer*

The equipment and procedure used were similar to that described in Example 6 above. The catalyst was made by adding 0.35 gram (0.001 mole) of vanadium tris(acetylacetonate) and 5 milliliters of a methylene chloride solution 1.0 molar in trivalent aluminum (made by adding triisobutylaluminum and aluminum chloride in 2:1 molar proportions) to one liter of nitrogen-sparged agitated methylene chloride at 0° C. After 5 minutes 2 milliliters of 2-methyl-2,5-norbornadiene were injected. The nitrogen inflow was stopped and a monomer gas stream was introduced supplying a mixture of ethylene 750 cc./min.) and propylene (2250 cc./min.). The total monomer concentration was less than 2 moles per liter of methylene chloride. During the following 30 minutes, copolymer steadily precipitated from the agitated cold (0° C.) reaction mixture. After the catalyst had been deactivated and the ethylene/propylene feed had been shut off, the reaction mixture was filtered. The copolymer thereby collected weighted 58.7 grams after mill drying.

*Example 11.—Preparation of ethylene/propylene/dicyclopentadiene copolymer*

Two milliliters of dicyclopentadiene were substituted for the 2 milliliters of 2-methyl norbornadiene in the procedure of Example 10. The total monomer concentration was less than 2 moles per liter of methylene chloride. The copolymer obtained weighed 51.8 grams.

Example 12.—Preparation of ethylene/propylene copolymer

The reaction equipment and gas purification trains described in Example 1B were used. A protective atmosphere of purified nitrogen was maintained except during the introduction of ethylene and propylene.

One liter of methylene chloride at about 25° C. was filtered through a column of silica gel directly into the reaction flask. Agitation was begun. After the temperature had been lowered to 0° C. by means of external cooling, 0.35 gram (0.001 mole) of vanadium tris(acetylacetonate) and 1.3 milliliters (0.005 mole) of triisobutylaluminum were injected from syringes through the serum cap of the reactor.

Five minutes later, the nitrogen feed was stopped and a feed stream supplying ethylene (700 cc./min.) and propylene (2100 cc./min.) was introduced into the agitated catalyst solution by means of the gas inlet tube which projected below the liquid surface. For the next 30 minutes the reaction mixture was agitated at —2 to 2° C. while monomer gas was introduced. The total monomer concentration was less than 2 moles per liter of methylene chloride. The copolymer product precipitated to form a slurry during this time. Then 10 milliliters of n-butanol were introduced to deactivate the catalyst; the monomer feed stream was stopped. Three grams of ethylene/propylene copolymer were obtained by filtering the reaction mixture and air drying the solid collected.

Example 13.—Preparation of ethylene/propylene copolymer

The general procedure of Example 12 was employed except that: 0.11 milliliter (0.001 mole) of titanium tetrachloride was substituted for the 0.35 gram of vanadium tris(acetylacetonate); the catalyst aging time was shortened to about 2 minutes; isopropanol was substituted for n-butanol. The total monomer concentration was less than 2 moles per liter of methylene chloride. 7.7 grams of ethylene/propylene copolymer were collected.

Example 14.—Preparation of ethyelene/propylene copolymer

The general procedure of Example 12 was employed except that: 5 milliliters of a methylene chloride solution 0.2 molar in oxyvanadiumtriisobutoxide (0.001 mole) were substituted for the 0.35 gram of vanadium tris(acetylacetonate); 8.6 milliliters of a methylene chloride solution 0.8 molar in trivalent aluminum (0.007 mole) (made by adding triisobutyl aluminum and aluminum chloride in 2:1 molar proportions) were substituted for the 1.3 milliliters of triisobutyl aluminum. The total monomer concentration was less than 2 moles per liter of methylene chloride. The slurry obtained during the copolymerization was separated from the deactivated reaction mixture by filtration, washed with methylene chloride with stirring, and dried to give 15.7 grams of ethylene/proplyene copolymer exhibiting an inherent viscosity (0.1% solution in tetrachloroethylene at 30° C.) of 4.41.

Example 15.—Preparation of ethylene/propylene/1,4-hexadiene copolymer

The general procedure of Example 12 was employed except that: 5 milliliters of a methylene chloride solution 0.2 molar in oxyvanadiumtriisobutoxide (0.001 mole) were substituted for the 0.35 gram of vanadium tris(acetylacetonate); 6.2 milliliters of a methylene chloride solution 0.8 molar in trivalent aluminum (0.005 mole) (made by adding triisobutyl aluminum and aluminum chloride in 2:1 molar proportions) were substituted for the 1.3 milliliters of triisobutyl aluminum; 10 milliliters of 1,4-hexadiene were injected into the reaction flask at the time the ethylene and propylene feed stream began; the reaction was stopped by adding 5 milliliters of isopropanol. The total monomer concentration was less than 2 moles per liter of methylene chloride. The slurry was filtered and the solid collected was washed with methylene chloride and dried. Nine grams of rubbery ethylene/propylene/1,4-hexadiene copolymer were obtained exhibiting an inherent viscosity (0.1% solution in tetrachloroethylene at 30° C.) of 2.49.

Example 16.—Preparation of ethylene/propylene/5-methylene-2-norbornene copolymer The apparatus used was similar to that described in Example 1 above. The one-liter reactor, which was continually agitated, was equipped with a water-cooled condenser and cooled by a Dry Ice-acetone bath.

After the apparatus had been flame-dried, one liter of silica gel dried methylene chloride was added to the reactor and sparged with nitrogen while being cooled to —4° C. After 1.07 grams (1.2 cc., 0.010 mole) of 5-methylene-2-norbornene had been injected, the nitrogen was shut off and a gaseous feed stream of ethylene (rate: 1030 cc./min.) and propylene (rate: 2170 cc./min.) was started. The temperature was —9° C. Then the following catalyst components were injected in turn into the monomer solution: 0.35 gram (0.001 mole) of vanadium tris(acetylacetonate); 15.8 cc. of a 0.57 molar methylene chloride solution of isobutylaluminum dibromide (0.009 mole); 7.8 cc. of a 1.15 molar methylene chloride solution of diisobutylaluminum bromide (0.009 mole); and 0.35 gram (0.001 mole) of vanadium tris(acetylacetonate). Gas absorption occurred rapidly over a 90-minute period during which copolymer precipitated to form a slurry; the temperature ranged between —8 and 5° C. The total monomer concentration was less than 2 moles per liter of methylene chloride.

After the catalyst had been deactivated by introduction of 10 cc. of ethanol, the copolymer was collected by filtration, washed three times with ethanol in a Waring "Blendor," washed once with acetone, and mill-dried at 100° C. The ethylene/propylene/5-methylene-2-norbornene product weighed 257 grams.

Example 17.—Continuous preparation of ethylene/propylene/5-methylene-2-norbornene copolymer The reaction vessel was a 500-ml. round-bottom glass flask (330-ml. capacity) equipped with an agitator, a condenser, a thermometer, gas inlet and outlet tubes, and openings for admission of the catalyst and diene streams and overflow of the reaction mixture. Three 2-liter glass supply tanks were connected by copper feed lines to the reactor. Each tank was flame-dried, nitrogen sparged, and filled with one liter of methylene chloride. Into the first tank was injected 6.4 grams (7.2 cc., 0.060 mole) of 5-methylene-2-norbornene. Into the second tank was added 0.80 gram (0.0030 mole) of vanadium oxybis(acetylacetonate). Into the third tank was injected 18 cc. of a methylene chloride solution 1.5 molar in diisobutyl aluminum chloride (0.027 mole). The solutions in tanks 2 and 3 each flowed thereafter at the rate of 7 cc./min. to a premixing chamber; the residence time therein was about 8 minutes.

Four minutes after the feed streams from tanks 2 and 3 had been started, a monomer gas mixture (purified by a procedure similar to that described in Example 1) supplied ethylene and propylene to the reactor at the respective rates of 0.81 liter/min. and 2.43 liters/min. The temperature therein was —10° C. Four minutes later the clear pale amber catalyst solution from the premixing chamber began entering the reactor. The 5-methylene-2-norbornene solution from tank 1 was introduced into the reactor at the rate of 7 cc./min. The total monomer concentration was less than 2 moles per liter of methylene chloride. Copolymer began precipitating from the reaction mixture. The reaction conditions were:

Residence time: 16 minutes
Vanadium concentration: 0.001 molar
Aluminum concentration: 0.009 molar
Diene concentration: 0.020 molar
Reactor temperature: —3 to —10° C.

The slurry formed overflowed into a deactivator flask where it was continuously agitated with n-butanol. The flask was emptied intermittently, fresh n-butanol thereafter being supplied each time. The copolymer was collected by filtration, washed with acetone in a Waring "Blendor," and mill dried. The yield was 20.5 grams/hour (14.1 grams/liter/hour). The rubbery copolymer had 48 weight percent propylene units and 4.6 weight percent diene units.

*Example 18.—Preparation of ethylene/propylene copolymer*

The reaction flask was a 500-milliliter glass resin flask equipped with a stirrer, a thermometer, a gas inlet tube, a gas outlet tube, and liquid inlet tube covered with a rubber (serum) cap. This apparatus was flame dried and cooled to −20° C. under a stream of purified nitrogen which was maintained during subsequent operations until monomer gases were introduced. Two hundred milliliters of ethyl chloride was distilled through a column of silica gel directly into the reaction flask. The rapidly stirred ethyl chloride was then sparged with the purified nitrogen for about 5 minutes. Then 0.07 gram (0.0002 mole) of vanadium tris(acetylacetonate) and 0.3 milliliter (0.0014 mole) of distilled diisobutylaluminum monochloride were introduced into the reactor (isobutyl:V molar ratio 15:1). A reddish-brown solution resulted which gradually became light brown.

Immediately thereafter, the nitrogen feed was stopped and a feed stream supplying ethylene and propylene at respective rates of 700 and 2100 cc./min. was introduced into the agitated catalyst solution by means of the gas inlet tube which projected below the liquid surface. The ethylene and propylene had been separately metered through flowmeters connected to separate purification trains where they passed successively through a column of silica gel, 3 columns each containing 20% solutions of aluminum triisobutyl in "Nujol" oil (a liquid petrolatum of specific gravity 0.88/0.90 at 60° F.), a column of "Nujol" oil, and a final silica gel column leading to a T-tube joining the streams. The nitrogen was purified by passage through a similar train.

For 30 minutes the reaction mixture was agitated at about −20° C. while monomer gases were introduced. The total monomer concentration has a maximum value of 3.9 moles per liter of ethyl chloride. The copolymer product precipitated to form a slurry during this period. Then one milliliter of n-butanol was introduced to deactivate the catalyst; the monomer feed stream was stopped. The copolymer was collected by filtration and washed with acetone. After air drying, 21.5 grams of rubbery copolymer were obtained containing 55% propylene units (by weight) and exhibiting an inherent viscosity (0.1% solution in tetrachloroethylene at 30° C.) of 5.12.

*Example 19. — Preparation of ethylene/propylene/1,4-hexadiene copolymer*

The equipment described in part B of Example 1 was used. The reactor was flame dried and cooled to 0° under a stream of purified nitrogen which was maintained during subsequent operations until monomer gases were introduced. One liter of 1,2-dichloroethane at about 20° C. was filtered through a column of silica gel directly into the reaction flask. The filtered, rapidly stirred 1,2-dichloroethane was then sparged with the purified nitrogen for about 30 minutes. Then 0.35 gram (0.001 mole) of vanadium tris(acetylacetonate) and 1.3 milliliters (0.007 mole) of distilled diisobutylaluminum monochloride were introduced into the reactor (isobutyl:V molar ratio 14:1). A reddish-brown solution resulted which gradually became light brown.

Five minutes later, the nitrogen feed was stopped, 10 milliliters of 1,4-hexadiene were added, and a feed stream supplying ethylene and propylene at respective rates of 700 and 2100 cc./min. was introduced into the agitated catalyst solution.

For 30 minutes the reaction mixture was agitated at about 0° C. while monomer gases were introduced. The total monomer concentration was less than 2 moles per liter of 1,2-dichloroethane. The copolymer product precipitated to form a slurry during this period. Then one milliliter of n-butanol was introduced to deactivate the catalyst; the monomer feed stream was stopped. The copolymer was collected by filtration and washed with acetone. After air drying, 28.8 grams of rubbery ethylene/propylene/1,4-hexadiene copolymer were obtained containing 54% propylene monomer units (by weight) and 0.57 moles of 1,4-hexadiene monomer units/kilogram. It exhibited an inherent viscosity (0.1% solution in tetrachloroethylene at 30° C.) of 1.89.

*Example 20. — Preparation of ethylene/propylene/1,4-hexadiene copolymer*

The equipment described in part B of Example 1 was used. The reactor was flame dried and cooled to −40° C. under a stream of purified nitrogen which was maintained during subsequent operations until monomer gases were introduced. One liter of ethyl chloride, which had been liquefied at about −37° C., was pressured through silica gel directly into the reaction flask. The rapidly stirred ethyl chloride was then sparged with the purified nitrogen for about 5 minutes. Then 0.35 gram (0.001 mole) of vanadium tris(acetylacetonate) and 8 milliliters of 1,4-hexadiene were introduced. The reactor temperature had been allowed to rise to −25° C. Then 0.009 mole of diisobutylaluminum monochloride was added to the reactor (isobutyl:V molar ratio 18:1) as 6 milliliters of a 1.5 molar solution in methylene chloride. A reddish-brown solution resulted which gradually became light brown.

One minute later, the nitrogen feed was stopped and a feed stream supplying ethylene and propylene at respective rates of 300 and 3000 cc./min., was introduced into the agitated catalyst solution which had warmed to −12° C.

For 15 minutes the reaction mixture was agitated at about −10 to −13° C. while monomer gases were introduced. The ethylene feed rate was 1500 cc./min. the final 10 minutes. The total monomer conecntration was less than 4.0 moles per liter of ethyl chloride. The copolymer product precipitated to form a slurry during the reaction. Then 30 milliliters of n-butanol were introduced to deactivate the catalyst; the monomer feed stream was stopped. The copolymer was collected by filtration and dried. Thirty-two grams of rubbery ethylene/propylene/1,4-hexadiene copolymer were obtained containing 52% propylene monomer units (by weight), 5.1% 1,4-hexadiene monomer units (by weight), and exhibiting an inherent viscosity (0.1% solution in tetrachloroethylene at 30° C.) of 1.38.

*Example 21*

The apparatus was a modified Parr hydrogenator. A 500-ml. glass pressure bottle served as the reaction vessel. A line from a cylinder of very pure ethylene gas was joined at T-joint X to a line from a cylinder of very pure propylene. Beyond the T-joint was valve B which joined a line leading to a second T-joint (Y). One end of T-joint Y was equipped with a screw cap, the other end led through a 3-inch length of ¼″-outer diameter copper tubing to valve C, attached, in turn, to a line going through and ending just below the pressure bottle cap. A thermocouple was fitted in the bottle cap and extended to the bottom of the bottle. In the line between the propylene cylinder and T-joint X was a T-joint Z which led to a valve A in turn connected to a gas outlet trap containing "Nujol" oil.

The pressure bottle, when detached, was loaded under nitrogen with 200 milliliters of silica gel dried methylene chloride, 2 milliliters of 1,4-hexadiene (0.017 mole), and 140.5 milligrams (0.0004 mole) of vanadium tris (acetylacetonate). This solution was cooled under nitrogen in an acetone-ice bath (—7° C.) and attached to the shaker in the Parr apparatus. The system was then flushed three times with propylene; valves B and C were open, valve A was closed; after the system had been pressured with 10 lb./sq. in. (gauge) propylene, valve A was opened. Valve A was finally closed, agitation was begun, and the system was pressured with 50 lb./sq. in. (gauge) propylene until equilibrium was reached. The temperature inside the bottle rose to 25° C.; it was kept from going still higher by directing a stream of compressed air on the outside of the bottle. The liquid volume in the bottle increased about 50 percent as a result of the propylene dissolved therein at the operating pressure. Agitation was stopped.

The propylene cylinder was shut, valve C above the pressure bottle reactor was closed, and the pressure in the lines released by opening and closing valve A. After the screw cap on T-joint Y had been opened, a slow stream of ethylene gas blanketed the opening while 2 milliliters of a tetrachloroethylene solution (into which 0.002 mole of triisobutyl aluminum and 0.001 mole of aluminum trichloride had been dissolved) were introduced into the copper tubing above valve C from a syringe. The system was then closed by replacing the cap. After the line had been pressured with ethylene to a gauge reading of 60 lb./sq. in., valve C was opened to admit ethylene and the aluminum solution into the pressure bottle to start the copolymerization reaction. The shaker was started again.

During the following 30 minutes the ethylene pressure was maintained at 60 lb./sq. in (gauge). In the first minute in the temperature rose to 35° C.; the stream of compressed air was again applied for cooling. Thereafter the temperature slowly dropped, reaching 29.5° C. at the end of the run. A very viscous, slightly turbid solution formed. The reaction was stopped by pressuring 4 milliliters of isopropanol through T-joint Y (by the same technique used for introducing the aluminum alkyl solution). One minute later the agitation was stopped. The pressure was released over a 20-minute period by venting gases through valve A; the solution temperature dropped appreciably and swollen copolymer began to separate. Finally, the reaction mixture was stirred into 600 milliliters of acetone. The resulting mixture was stirred for one hour. During the copolymerization the propylene concentration in the reaction vessel was approximately 6.0 moles per liter of methylene chloride based on a volume increase of approximately 50 percent when the propylene was pressured in. The rubbery precipitated copolymer, collected by filtration through a cheese cloth, was dried at 95° C. to a constant weight of 7.73 grams. This copolymer contained 59 to 60% weight propylene monomer units and 1.1 weight percent hexadiene monomer units.

*Example 22*

The apparatus described in Example 21 was used except that one storage cylinder was discontinued, the other cylinder being filled with 47 grams of propylene and 12 grams of ethylene (E:P molar ratio=1:2.6).

The pressure bottle was loaded with 200 milliliters ethyl chloride (distilled through silica gel) at —10° C., 2 milliliters (0.017 mole) of 1,4-hexadiene, and 139.9 milligrams (0.0004 mole) of vanadium tris(acetylacetonate). The bottle was then installed in the Parr apparatus and the system flushed thrice with the ethylene/propylene mixture in the manner described in Example 21 wherein propylene was used. The system was then pressured with the ethylene/propylene gas mixture. After the temperature of the ethyl chloride monomer solution had risen to 20° C., the total pressure was 38 lb./sq. in (gauge). Two milliliters of the aluminum alkyl catalyst solution described in Example 21 were introduced from T-joint Y by 50 lb./sq. in. (gauge) ethylene/propylene gas pressure. Agitation was begun. One minute later the temperature had risen to 37° C. A stream of compressed air was applied to the outside of the pressure bottle for cooling. Thereafter the temperature slowly fell, reaching a value of 26° C. at the end of one hour. The pressure was increased to 60 lb./sq. in. (gauge) after 9 minutes. Twenty-three minutes later it had fallen to 52 lb./sq. in. (gauge). The final pressure was 48 lb./sq. in. (gauge). A very viscous turbid solution resulted in the temperature range of 26 to 37° C. indicating a high degree of solubility of the copolymer.

After one hour reaction time, 3 milliliters of isopropanol was added, according to the procedure of Example 21, to deactivate the catalyst. The pressure bottle was cooled to 10° C. and the system was slowly vented; more solid copolymer separated during this operation. The cold ethyl chloride-copolymer mixture was worked up according to the procedure of Example 21 to give 5.37 grams of a rubbery copolymer. A hot solution of this product in 500 milliliters of tetrachloroethyelne was extracted with 300 milliliters of 8% hydrochloric acid and subsequently stirred into 1.5 liters of acetone. The copolymer, thereby coagulated, was filtered off and dried at 95° C. The final product, weighing 5.16 grams, analyzed for 26 percent by weight propylene monomer units and 2.3 percent hexadiene monomer units.

As many widely different embodiments of this invention may be made without departing from the spirit and scope thereof, it is to be understood that his invention is not limited to the specific embodiments thereof except as defined in the appended claims.

What is claimed is:

1. In the process of preparing an elastomeric copolymer having about 20 to 75 percent by weight of ethylene units by copolymerizing ethylene with a member selected from the group consisting of (a) at least one alpha monoolefin having the structure R—CH=CH$_2$ wherein R is an alkyl radical of not more than 8 carbon atoms and (b) at least one of said alpha monoolefins and at least one non-conjugated hydrocarbon diene, said process being carried out in the presence of a coordination catalyst system comprising a vanadium compound with an organoaluminum compound; the improvement consisting essentially of preparing said copolymer in the form of a slurry by carrying out the copolymerization at a temperature between about —30 and 50° C. in a halogenated liquid hydrocarbon selected from the group consisting of methylene chloride, ethyl chloride and 1,2-dichloroethane; with the provisos that the total concentration of copolymerizable monomers shall not exceed 2 molar when said liquid hydrocarbon is methylene chloride, shall not exceed 2 molar when said liquid hydrocarbon is 1,2-dichloroethane and shall not exceed 5 molar when said liquid hydrocarbon is ethyl chloride; and the copolymerization temperature shall not exceed the boiling point at atmospheric pressure of the particular liquid halogenated hydrocarbon which is being used.

2. The process of claim 1 wherein the vanadium compound is selected from the group consisting of vanadium tris(acetylacetonate), vanadium oxybis(acetylacetonate), vanadium oxytris(isobutoxide) and vanadium oxytrichloride and the organoaluminum compound is selected from the group consisting of diisobutylaluminum chloride, isobutylaluminum dichloride, triisobutylaluminum, diisobutylaluminum bromide, isobutylaluminum dibromide, the reaction product of 0.5 to 2.0 moles of aluminum bromide with 1.0 mole of triisobutylaluminum and the reaction product of 0.5 to 2.0 moles of aluminum chloride with 1.0 mole of triisobutylaluminum, the proportions of vanadium compound and organoaluminum compound being selected so that the molar ratio of isobutyl radicals to vanadium atoms is at least 6:1 with the vanadium concentration in said catalyst system being about 0.0001 molar to 0.1 molar.

3. A process according to claim 1 wherein propylene is copolymerized with ethylene.

4. A process according to claim 1 wherein propylene and 1,4-hexadiene are copolymerized with ethylene.

5. A process according to claim 4 wherein the coordination catalyst is a mixture of vanadium tris(acetylacetonate) and the reaction product of 1.0 mole of triisobutylaluminum and 0.5 mole of aluminum chloride.

6. A process according to claim 5 wherein the copolymerization is carried out at a temperature of about 0° C.

7. A process according to claim 1 wherein the halogenated liquid hydrocarbon is methylene chloride.

8. A process according to claim 1 wherein the halogenated liquid hydrocarbon is ethyl chloride.

9. A process according to claim 1 wherein the halogenated liquid hydrocarbon is 1,2-dichloroethane.

References Cited by the Examiner

UNITED STATES PATENTS

| | | | |
|---|---|---|---|
| 2,862,917 | 12/1958 | Anderson et al. | 260—94.9 |
| 2,933,480 | 4/1960 | Gresham et al. | 260—80.5 |
| 2,967,176 | 1/1961 | Pilar | 260—88.2 |
| 2,980,655 | 4/1961 | Glass et al. | 260—80.3 |
| 3,000,866 | 9/1961 | Tarney | 260—80.2 |
| 3,051,690 | 8/1962 | Vandenberg | 260—94.9 |
| 3,063,973 | 11/1962 | Gladding et al. | 260—79.5 |
| 3,066,123 | 11/1962 | Strohmayer et al. | 260—94.3 |
| 3,131,171 | 4/1964 | Calfee | 260—85.3 |

FOREIGN PATENTS

| | | |
|---|---|---|
| 552,719 | 12/1956 | Belgium. |
| 574,445 | 3/1958 | Italy. |
| 1,182,330 | 1/1959 | France. |

OTHER REFERENCES

Hildebrand and Scott, "Solubility of Nonelectrolytes," 3rd, p. 172, Reinhold, New York (1950).

JOSEPH L. SCHOFER, *Primary Examiner.*

JOSEPH R. LIBERMAN, JAMES A. SEIDLECK, W. G. GOODSON, W. HOOVER, *Assistant Examiners.*